(12) United States Patent
Wei et al.

(10) Patent No.: US 11,276,345 B2
(45) Date of Patent: Mar. 15, 2022

(54) DISPLAY DEVICE WITH FEEDBACK VIA PARALLEL CONNECTIONS FROM DISTRIBUTED DRIVER CIRCUITS TO A SINGLE WIRE INTERFACE

(71) Applicant: Huayuan Semiconductor (Shenzhen) Limited Company, Shenzhen (CN)

(72) Inventors: Chih-Chang Wei, Taoyuan (TW); Junjie Zheng, Cupertino, CA (US); Richard Landry Gray, Taipei (TW); Ping-Yuan Lin, New Taipei (TW); Jyun-Long Lin, New Taipei (TW); Lilun Chi, Taipei (TW)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 0 days.

(21) Appl. No.: 17/067,432

(22) Filed: Oct. 9, 2020

(65) Prior Publication Data

US 2021/0366369 A1 Nov. 25, 2021

Related U.S. Application Data

(60) Provisional application No. 63/029,389, filed on May 22, 2020, provisional application No. 63/042,548, filed on Jun. 22, 2020, provisional application No. 63/059,737, filed on Jul. 31, 2020.

(51) Int. Cl.
*G09G 3/32* (2016.01)

(52) U.S. Cl.
CPC ....... *G09G 3/32* (2013.01); *G09G 2310/0202* (2013.01); *G09G 2330/028* (2013.01)

(58) Field of Classification Search
CPC ....................................................... G09G 5/10
See application file for complete search history.

(56) References Cited

U.S. PATENT DOCUMENTS

| 10,490,143 | B2 | 11/2019 | Kumamoto et al. |
| 10,593,256 | B2 | 3/2020 | Li et al. |
| 10,789,896 | B2 | 9/2020 | Liu et al. |
| 10,909,911 | B1 | 2/2021 | Zheng et al. |
| 10,950,194 | B1 | 3/2021 | Chan et al. |
| 2006/0092346 | A1 | 5/2006 | Moon et al. |
| 2007/0035706 | A1 | 2/2007 | Margulis |
| 2008/0136769 | A1* | 6/2008 | Kim ..................... G09G 3/3406 345/102 |
| 2008/0136770 | A1 | 6/2008 | Peker et al. |

(Continued)

*Primary Examiner* — Chad M Dicke
(74) *Attorney, Agent, or Firm* — Fenwick & West LLP

(57) ABSTRACT

Embodiments relate to a display device that includes a control circuit, an array of light emitting diode (LED) zones, and an array of zone integrated circuits that are distributed in the display area. The zone integrated circuits may comprise integrated LED and driver circuits with embedded sensors or the zone integrated circuits may comprise dedicated sensor devices. The zone integrated circuits are arranged in groups that are coupled to a shared single wire communication line. The control circuit provides control signals that control the driver circuits to drive the LED zones and may provide commands to request feedback data from the zone integrated circuits. Responsive to the commands, the zone integrated circuits output feedback data that is provided to the control circuit via the shared single wire communication line.

21 Claims, 11 Drawing Sheets

(56) References Cited

U.S. PATENT DOCUMENTS

| | | | |
|---|---|---|---|
| 2010/0309100 A1* | 12/2010 | Cok | G09G 3/3208 |
| | | | 345/76 |
| 2011/0109228 A1* | 5/2011 | Shimomura | H05B 45/37 |
| | | | 315/113 |
| 2011/0267375 A1* | 11/2011 | Yang | G09G 3/3406 |
| | | | 345/690 |
| 2012/0050343 A1* | 3/2012 | Kim | G09G 3/3406 |
| | | | 345/690 |
| 2014/0152902 A1 | 6/2014 | Morrisseau | |
| 2016/0088251 A1 | 3/2016 | Luo et al. | |
| 2017/0269782 A1 | 9/2017 | Wu | |
| 2020/0211496 A1 | 7/2020 | Wang et al. | |
| 2020/0211500 A1 | 7/2020 | Canberk et al. | |
| 2020/0211502 A1 | 7/2020 | Kim et al. | |
| 2020/0212137 A1 | 7/2020 | Wang et al. | |
| 2020/0312220 A1* | 10/2020 | Hussell | H05B 45/50 |

\* cited by examiner

DISPLAY DEVICE WITH FEEDBACK VIA PARALLEL CONNECTIONS FROM DISTRIBUTED DRIVER CIRCUITS TO A SINGLE WIRE INTERFACE

CROSS-REFERENCE TO RELATED APPLICATIONS

This application claims the benefit of U.S. Provisional Application No. 63/029,389 filed on May 22, 2020, U.S. Provisional Application No. 63/042,548 filed on Jun. 22, 2020, and U.S. Provisional Application No. 63/059,737 filed on Jul. 31, 2020, which are each incorporated by reference herein.

BACKGROUND

This disclosure relates generally to light emitting diodes (LEDs) and LED driver circuitry for a display, and more specifically to a display architecture with distributed driver circuits.

LEDs are used in many electronic display devices, such as televisions, computer monitors, laptop computers, tablets, smartphones, projection systems, and head-mounted devices. Modern displays may include well over ten million individual LEDs that may be arranged in rows and columns in a display area. In order to drive each LED, current methods employ driver circuitry that requires significant amounts of external chip area that impacts the size of the display device.

SUMMARY

In a first aspect, a display device comprises an array of light emitting diode zones, a group of driver circuits distributed in the display area, a control circuit, and a shared single wire communication line that couples the group of driver circuits to the control circuit. The control circuit generates driver control signals and command signals. The group of driver circuits each drive a respective light emitting diode zone by controlling the respective driver currents in response to the driver control signals. The light emitting diode zones each comprise one or more light emitting diodes that generate light in response to respective driver currents. Furthermore, responsive to a target driver circuit in the group of driver circuits receiving a command signal from the control circuit, the target driver circuit outputs a readback signal to the control circuit via the shared single wire communication line.

In a second aspect, a zone integrated circuit includes a driver circuit having driver control logic and a set of external pins including an LED driving output pin, a data input pin, a data output pin, a power line communication pin, and a ground pin. The control logic operates in at least an addressing mode and an operational mode. In the operational mode, the control logic obtains a driver control signal and controls a driver current to an LED zone based on the driver control signal. Furthermore, in the operational mode, the control logic receives commands and outputs readback data responsive to the commands. In the addressing mode, the control logic obtains an incoming addressing signal, stores an address for the driver circuit based on the incoming addressing signal, and generates an outgoing addressing signal based on the incoming addressing signal. The LED driving output pin sinks the driver current during the operational mode and outputs the outgoing addressing signal during the addressing mode. The data input pin receives the incoming addressing signal during the addressing mode. The data output pin outputs readback data to the shared single wire communication line in response to the commands. The power communication pin is coupled to a power communication line to provide a supply voltage and to provide the driver control signal and the commands as digital data modulated on the supply voltage. The ground pin provides a path to ground.

In a third aspect, a zone integrated circuit includes a driver circuit having driver control logic and a set of external pins including an LED driving output pin, a data input pin, a data output pin, a bidirectional dimming pin, a power pin, and a ground pin. The control logic operates in at least an addressing mode and an operational mode. In the operational mode, the control logic obtains a driver control signal and controls a driver current to an LED zone based on the driver control signal. Furthermore, in the operational mode, the control logic receives commands and outputs readback data responsive to the commands. In the addressing mode, the control logic obtains an incoming addressing signal, stores an address for the driver circuit based on the incoming addressing signal, and generates an outgoing addressing signal based on the incoming addressing signal. The LED driving output pin sinks the driver current during the operational mode. The data input pin receives the incoming addressing signal during the addressing mode and the data output pin outputs the outgoing addressing signal during the addressing mode. The bidirectional dimming pin receives the driver control signals from the single wire communication line and outputs the readback data to the single wire communication line responsive to the commands. The power pin provides a supply voltage and the ground pin provides a path to ground.

BRIEF DESCRIPTION OF THE DRAWINGS

The teachings of the embodiments of the present invention can be readily understood by considering the following detailed description in conjunction with the accompanying drawings.

The features and advantages described in the specification are not all inclusive and, in particular, many additional features and advantages will be apparent to one or ordinary skill in the art in view of the drawings, specification, and claims. Moreover, it should be noted that the language used in the specification has been principally selected for readability and instructional purposes, and may not have been selected to delineate or circumscribe the inventive aspect matter.

DETAILED DESCRIPTION OF EMBODIMENTS

Embodiments relate to a display device that includes a control circuit, an array of light emitting diode (LED) zones, and an array of zone integrated circuits that are distributed in the display area. The zone integrated circuits may comprise integrated LED and driver circuits with embedded sensors or the zone integrated circuits may comprise dedicated sensor devices. The zone integrated circuits are arranged in groups that are coupled to a shared single wire communication line. The control circuit provides control signals that control the driver circuits to drive the LED zones and may provide commands to request readback data from the zone integrated circuits. Responsive to the commands, the zone integrated circuits output readback data that is provided to the control circuit via the shared single wire communication line.

Figure 1:
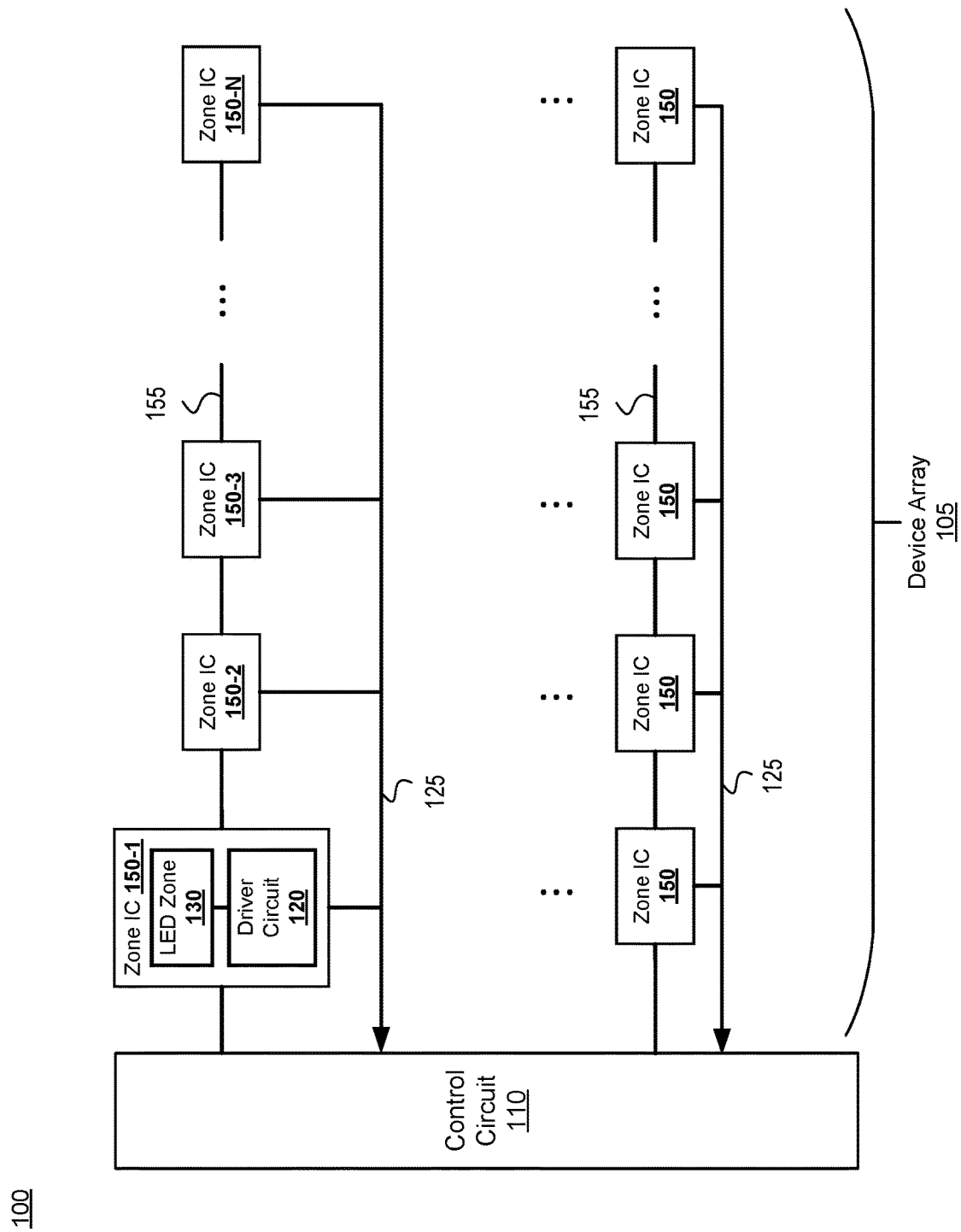
FIG. 1 is a circuit diagram of a display device including distributed driver circuits that provide feedback via a shared single wire communication line, according to one embodiment.

FIG. 1 is a circuit diagram of an electronic device 100. In one example embodiment, the electronic device 100 can be a display device for displaying images or video. In various embodiments, the electronic device 100 may be implemented in any suitable form-factor, including a display screen for a computer display panel, a television, a mobile device, a billboard, etc. The electronic device 100 may comprise a liquid crystal display (LCD) device or an LED display device. In an LCD display device, LEDs provide white light backlighting that passes through liquid crystal color filters that control the color of individual pixels of the display. In an LED display device, LEDs are directly controlled to emit colored light corresponding to each pixel of the display. In other embodiments, the electronic device 100 may comprise an array of sensors (e.g., temperature sensors, light sensors, voltage sensors) that may be utilized in conjunction with a display device or other device.

The electronic device 100 may include a device array 105 and a control circuit 110. The device array 105 comprises an array of zone integrated circuits (ICs) 150 (e.g., a two-dimensional array comprising rows and columns). In a display device, at least some of the zone ICs 150 may each include an LED zone 130 comprising one or more LEDs and an associated driver circuit 120 that drives the LED zone 130. The driver circuit 120 and corresponding LED zone 130 may be embodied in an integrated package such that the LED zone 130 is stacked over the driver circuits 120 on a substrate as further described in FIGS. 7-9. Alternatively, a zone IC 150 may comprise a driver circuit 120 coupled to an external LED zone that is not necessarily integrated with the driver circuit 120.

In an LCD display, an LED zone 130 can includes one or more LEDs that provide backlighting for a backlighting zone, which may include a one-dimensional or two-dimensional array of pixels. In an LED display, the LED zone 130 may comprise one or more LEDs corresponding to a single pixel or may comprise a one-dimensional array or two-dimensional array of LEDs corresponding to an array of pixels (e.g., one or more columns or rows). For example, in one embodiment, the LED zone 130 may comprise one or more groups of red, green, and blue LEDs that each correspond to a sub-pixel of a pixel. In another embodiment, the LED zone 130 may comprise one or more groups of red, green, and blue LED strings that correspond to a column or partial column of sub-pixels or a row or partial row of sub-pixels. For example, an LED zone 130 may comprise a set of red sub-pixels, a set of green sub-pixels, or a set of blue sub-pixels.

The LEDs of each LED zone 130 may be organic light emitting diodes (OLEDs), inorganic light emitting diodes (ILEDs), mini light emitting diodes (mini-LEDs) (e.g., having a size range between 100 to 300 micrometers), micro light emitting diodes (micro-LEDs) (e.g., having a size of less than 100 micrometers), white light emitting diodes (WLEDs), active-matrix OLEDs (AMOLEDs), transparent OLEDs (TOLEDs), or some other type of LEDs.

The zone ICs 150 may furthermore include integrated sensors. For example, the driver circuit 120 may include one or more integrated sensors such as integrated temperature sensors, light sensors, voltage sensors, image sensors, or other sensing devices. In other instances, a zone IC 150 may comprise a dedicated sensor device that does not drive an LED zone 130 and instead performs one or more sensing functions.

The zone ICs 150 may be arranged in groups (e.g., rows) that share common power supply lines and/or communication lines. For example, the zone ICs 150 in a group may share common power and ground lines (not shown) and may be coupled in parallel to a shared single wire communication line 125. The shared single wire communication line 125 may be configured as a unidirectional line used only to transmit feedback data from the zone ICs 150 to the control circuit 110, or for bidirectional communication to both provide commands to the zone ICs 150 and provide feedback data to the control circuit 110. In embodiments in which the shared single wire communication line 125 is used only for feedback, the shared power line (not shown) may operate as a power communication line that both supplies power and provides commands as a digital signal modulated on the supply voltage, described in further detail below. Serial communication lines 155 also couple the zone ICs 150 of a group in series to each other and to the control circuit 110 to enable communications between the zone ICs 150 and the control circuit 110 via a serial chain.

The zone ICs 150 may operate in various modes including at least an addressing mode, a configuration mode, and an operational mode. During the addressing mode, the control circuit 110 initiates an addressing procedure to cause assignment of addresses to each of the zone ICs 150. During the configuration and operational modes, the control circuit 110 transmits commands and data that may be targeted to specific zone ICs 150 based on their addresses. In the configuration mode, the control circuit 110 configures driver circuits 120 with one or more operating parameters (e.g., overcurrent thresholds, overvoltage thresholds, clock division ratios, and/or slew rate control). During the operational mode, the control circuit 110 provides control data to the driver circuits 120 that causes the driver circuits to control the respective driver currents to the LED zones 130, thereby controlling brightness. The control circuit 110 may also issue commands to the zone ICs 150 during the operational mode to request readback data (e.g., sensor data), and the zone ICs 150 provide the readback data to the control circuit 110 in response to the commands.

The serial communication lines 155 may be utilized in the addressing mode to facilitate assignment of addresses. Here, an addressing signal is sent from the control circuit 110 via the serial communication lines 155 to the first zone IC 150-1 in a group of zone ICs 150. The first zone IC 150-1 stores an address based on the incoming addressing signal and generates an outgoing addressing signal for outputting to the next zone IC 150-2 via the serial communication line 155. The second zone IC 150-2 similarly receives the addressing signal from the first zone IC 150-1, stores an address based on the incoming addressing signal, and outputs an outgoing addressing signal to the next zone IC 150-3. This process continues through the chain of zone ICs 150. The last zone IC 150-N may optionally send its assigned address back to the control circuit 110 to enable the control circuit 110 to confirm that addresses have been properly assigned. The addressing process may be performed in parallel or sequentially for each group of zone ICs 150.

In an example addressing scheme, each zone IC 150 may receive an address, store the address, increment the address by 1 or by another fixed amount, and send the incremented address as an outgoing addressing signal to the next zone IC 150 in the group. Alternatively, each zone IC 150 may receive the address of the prior zone IC 150, increment the address, store the incremented address, and send the incremented address to the next zone IC 150. In other embodiments, the zone IC 150 may generate an address based on the incoming address signal according to a different function (e.g., decrementing).

After addressing, commands may be sent to the zone ICs 150 based on the addresses. The commands may include dimming commands to control dimming of the LED zones 130 or readback commands that request readback data from a zone IC 150. For dimming commands, the driver circuits 120 receive the dimming data and adjust the driving currents to the corresponding LED zone 130 to achieve the desired brightness. The readback commands may request information such as channel voltage information, temperature information, light sensing information, status information, fault information, or other data. In response to these commands, the zone ICs 150 may obtain the data from integrated sensors and send the readback data to the control circuit 110.

Commands may be sent to the zone ICs 150 via the shared single wire communication line 125, via the serial communication lines 155 and serially connected zone ICs 150, or via a separate power communication line (not shown). If commands are sent via the shared single wire communication line 125 or the power communication line (not shown), the targeted zone IC 150 having the specified address processes the command while the other zone ICs 150 may ignore the command. If the commands are sent via the serial communication lines 155, the zone ICs 150 that are not targeted by the command may propagate the command to an adjacent zone IC 150 via the serial communication lines 155 until it reaches the targeted zone IC 150, which processes the command.

In response to a readback command, the targeted zone IC 150 transmit the requested feedback data to the control circuit 110 via the shared single wire communication line 125. The remaining zone ICs 150 that are not targeted by the command may place their connection to the shared single wire communication line 125 in a high impedance state to avoid affecting the voltage on the shared single wire communication line 125. In an embodiment, responses to readback commands may include the address of the targeted zone IC 150 to enable the control circuit 110 to confirm which zone IC 150 provided the response.

In other embodiments, the control circuit 110 may issue a group command that is targeted to the group of zone ICs 150 instead of targeting an individual zone IC 150. In this case, each of the zone ICs 150 may respond according to different timing to avoid data collisions on the shared single wire communication line 125 and the control circuit 110 may aggregate the received data.

For example, in one embodiment, the control circuit 110 may issue a channel sensing command. Each zone IC 150 responds with a sensed channel voltage and the control circuit 110 applies a function to the sensed channel voltages (e.g., a min, max, or averaging function). For example, the control circuit 110 may determine the lowest sensed channel voltage in each group of zone ICs 150. This lowest detected voltage may be used to calibrate a supply voltage to the LED zones 130. In another example, a group command may be utilized for temperature sensing. Here, each zone IC 150 may output a sensed temperature and the control circuit may apply a function to the received temperatures (e.g., to determine an average temperature, minimum temperature, or maximum temperature) that is used to calibrate the driver currents to the LED zones 130. In another example, a group command may be utilized for fault detection. Here, a zone IC 150 that detects a fault condition may return a fault detection signal to the control circuit 110 via the shared single wire communication line 125.

The described communication protocol can be utilized to calibrate a display device 100. For example, the control circuit 110 can change both the LED current and the on/off duty cycle of the driver circuits 120 in order to change the effective brightness of each LED zone 130 based on received feedback from the zone ICs 150. More specifically, the control circuit 110 may calibrate the driver circuits 120 so that LED zones 130 each output the same brightness in response to the same brightness control signal, despite process variations in the LEDs or associated circuitry that may otherwise cause variations. The calibration process may be performed by measuring light output, channel voltages, temperature, or other data that may affect performances of the LEDs using sensors in the device array 105. The calibration process may also be performed by using sensors that are external to the device array 105. The calibration process may be repeated over time (e.g., as the electronic device 100 heats up during operation).

In other embodiments, a group of zone ICs 150 do not necessarily correspond to a row of the device array 105. In alternative embodiments, a group of zone ICs 150 may instead correspond to a partial row of the device array 105 or a full or partial column of the device array 105. In another embodiment, a group of zone ICs 150 may correspond to a block of adjacent or non-adjacent zone ICs 150 that may span multiple rows and columns.

In different configurations, each group of zone ICs 150 may include some number of circuits with an integrated driver circuit 120 and LED zone 130 and some number of sensor circuits. For example, the last zone IC 150-N in each row may correspond to a sensor circuit, or various sensor circuits may be interleaved with driver and LED circuits in each group of zone ICs 150.

Figure 2:
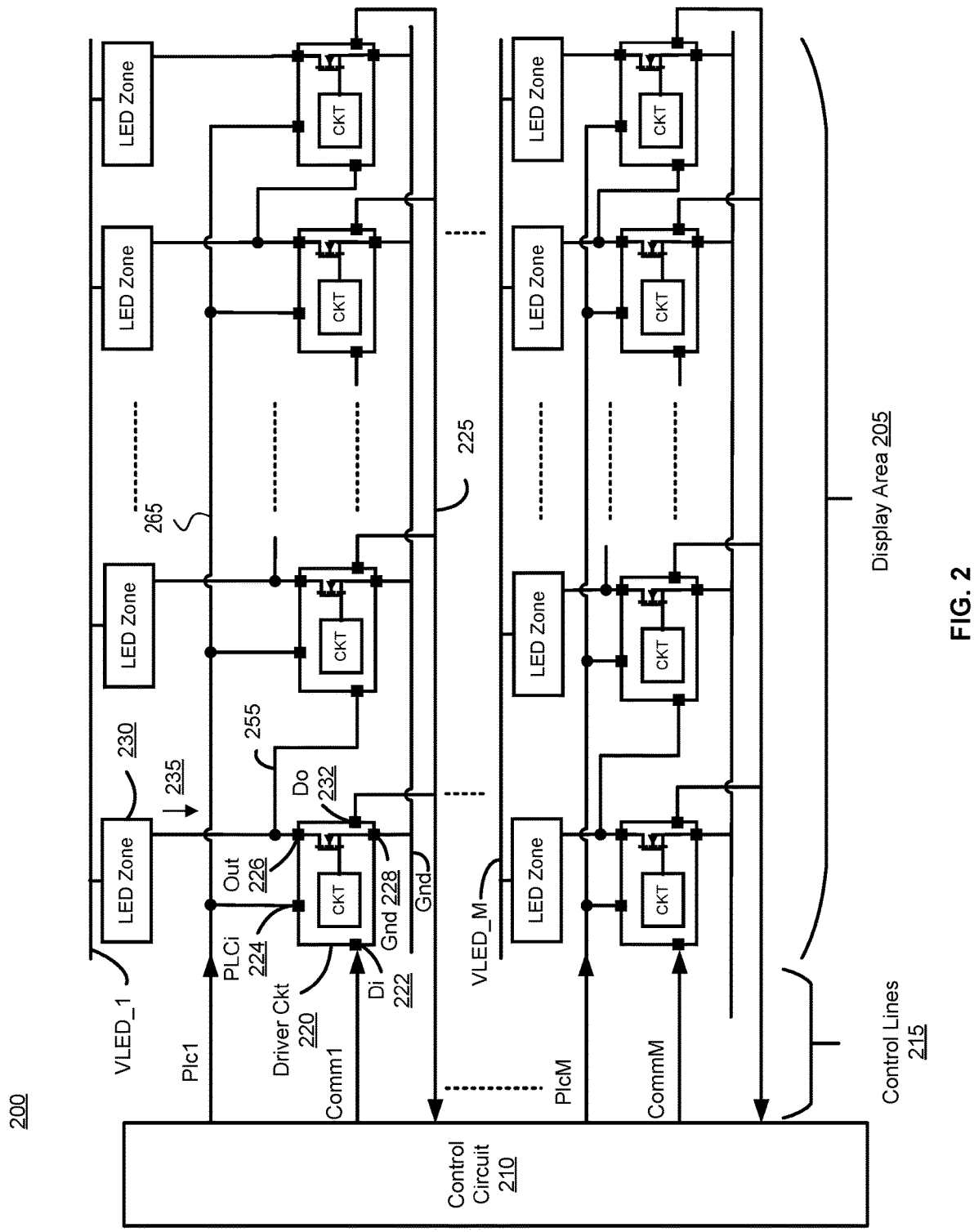
FIG. 2 is a circuit diagram of a display device including a 5-pin architecture for distributed driver circuits that provide feedback via a shared single wire communication line, according to one embodiment.

FIG. 2 is a circuit diagram of a display device 200 for displaying images or video utilizing the communication protocol described above. A display area 205 comprises an array of pixels for displaying images based on data received from the control circuit 210. In various embodiments, the display area 205 may include LED zones 230, a set of distributed driver circuits 220, power supply lines including VLED lines (e.g., VLED_1, . . . VLED_M) and ground (GND) lines, and various signaling lines including serial communication lines 255 that serially couple the driver circuits 220 to each other and to the control circuit 210, power communication lines 265, and a shared single wire communication line 225. The VLED lines provide power to the LED zones 230 (e.g., by supplying power to the anode of the LEDs in the LED zones 230). The GND lines provide a path to ground for the LED zones 230 and the driver circuits 220. The driver circuits 220 may include one or more integrated sensors. Furthermore, the display device 200 may optionally include one or more dedicated sensor circuits in a serial chain with the driver circuits 220 and that shares the same power communication lines 265, ground lines 225, and single wire communication line 225 as the driver circuits 220.

The driver circuit 220 may include a five-pin configuration as shown in the illustrated example of FIG. 2. In the five-pin configuration, the driver circuit 220 may include a data input pin (Di) 222, a power line communication input pin (PLCi) 224, one or more LED driving output pins (Out) 226, a data output pin 232, and a ground pin (Gnd) 228. In an embodiment, the LED driving output 226 may comprise a set of multiple pins to control multiple channels of the LED zone 230. For example, the LED driving output 226 may include 3 pins to control red, green, and blue channels of the LED zones 230.

The ground pin 228 is configured to provide a path to a ground line for the driver circuit 220, which may be common to the corresponding LED zone 230.

The power line communication input pin 224 is configured to receive a power line communication signal from the control circuit 210 via the common power communication lines 265 (e.g., Plc1, Plc2, . . . PlcM) for each group. The power line communication signal includes a supply voltage that may be modulated to encode the driver control signal or other control information as digital data. For example, the power line communication signal may encode operating parameter information or control data information for operating the driver circuit 220 and controlling brightness of the LED zones 230. The power communication line 265 may also be utilized to send commands to the driver circuits 220 or other zone ICs 150 (e.g., sensor circuits) during the operational mode to request status information such as channel voltage information, temperature information, fault information, or other data. In some embodiments, the power line communication signal supplies a direct current voltage between 3 and 12 volts for the supply voltage. In one embodiment, the power line communication signal may provide a power supply voltage of more than 4.5 volts with a digital data signal having a maximum data rate of up to 2 megahertz (MHz) with a 0.5 peak-to-peak voltage signal.

The data input pin 222 and the LED driving output pin 226 are coupled to the serial communication lines 255 to facilitate serial communication to and from the driver circuits 220. The serial communication lines 255 may be used, for example, to facilitate assignment of addresses to the driver circuits 220 as described above. Here, the LED driving output pin 226 serves a dual-purpose dependent on the mode of operation. In the addressing mode, the LED driving output pin 226 facilitates communications on the serial communication lines 255 as described above. In the operational mode of the display device 200, the LED driving output pin 226 is coupled to sink current from a corresponding LED zone 230 to control supply of the driver current 235.

In one embodiment, the serial communication line 255 between the control circuit 210 and the first driver circuit 220 may be coupled with the shared communication line 225 and share a common pin of the control circuit 210. Here, the shared pin provides bidirectional communication used to communicate from the control circuit 210 to the first driver circuit 220 during addressing and to communicate readback data to the control circuit 110 during the operational mode.

In alternative architectures, one or more of the sensor circuits (not shown) may be coupled to the shared single wire communication line 225 (and may optionally also be coupled in series between driver circuits 220). The sensor circuits may include similar pin configurations and external connections as the driver circuits 220 except that the sensor circuits are not coupled to driver LED zones 230. The sensor circuits may provide similar capabilities for facilitating serial communications within the group or the sensor circuits may be bypassed in the serial communication chain. In a specific example, the last element in each row may comprise a sensor circuit.

Figure 3:
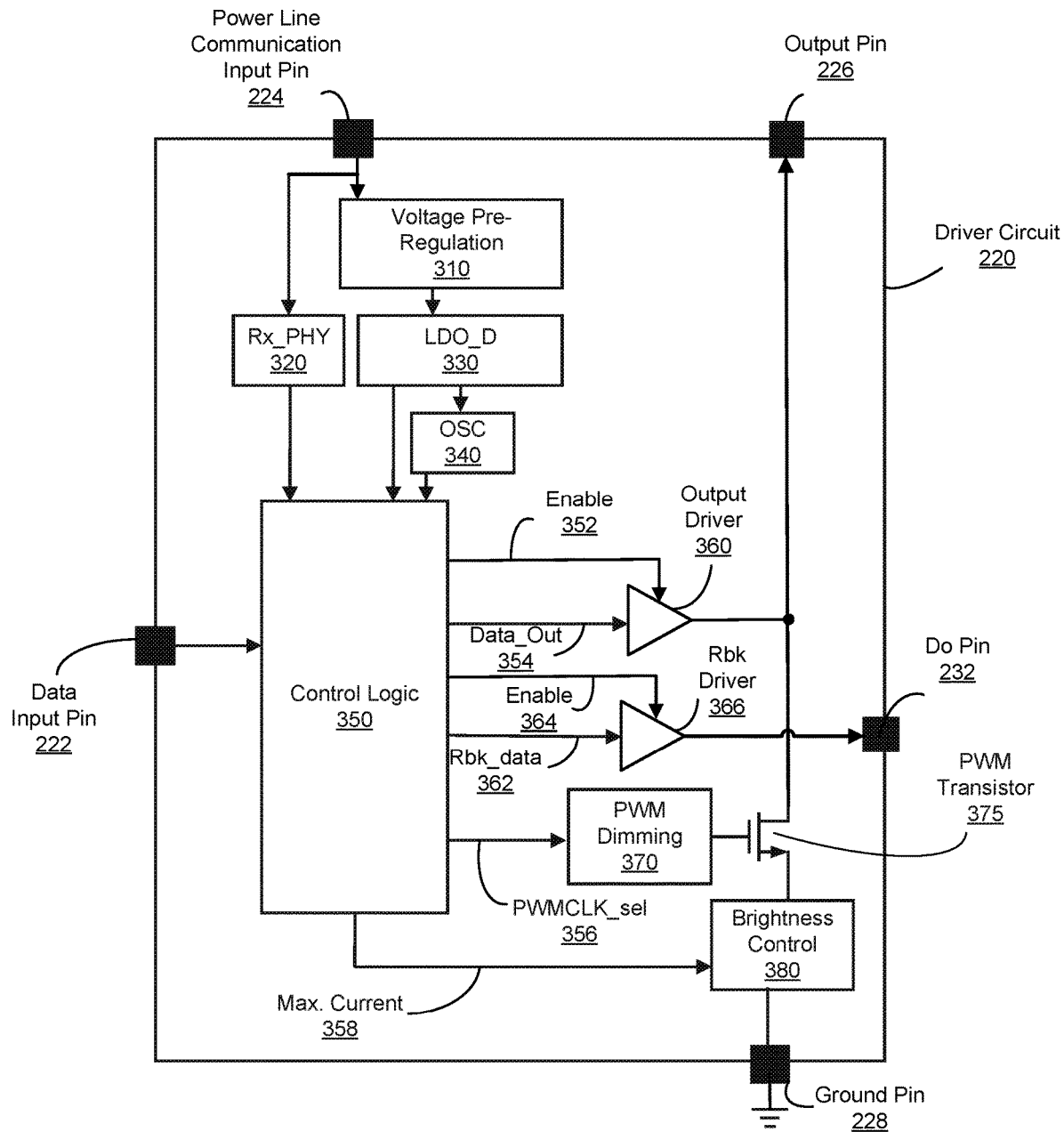
FIG. 3 is a circuit diagram of a 5-pin architecture of a driver circuit for a display device, according to one embodiment.

FIG. 3 is an example circuit diagram of the driver circuit 220, according to one embodiment. The driver circuit 220 may include a voltage pre-regulation circuit 310, an Rx_PHY 320, a low-dropout regulator LDO_D 330, an oscillator OSC 340, control logic 350, an output driver 360, a readback driver 366, a pulse width modulation (PWM) dimming circuit 370, a transistor 375, and a brightness control circuit 380. In various embodiments, the driver circuit 220 may include additional, fewer, or different components.

The Rx_PHY 320 is a physical layer that demodulates the PLC data from the PLC signal and provides the corresponding digital data to the control logic 350. The voltage pre-regulation circuit 310 performs pre-regulation of the power line communication signal. In one embodiment, the voltage pre-regulation circuit 310 comprises a first order RC filter followed by a source follower. The voltage pre-regulator 310 may optionally be omitted and the PLC signal may instead pass directly to the LDO-D 330. The power line communication signal is also provided to the Rx_PHY 320. The pre-regulated supply voltage is provided to the LDO_D 330. The LDO_D 330 converts the pre-regulated supply voltage into a steady direct current voltage (which may be lower than the pre-regulated supply voltage) used to power the oscillator OSC 340 and control logic 350. In an example embodiment, the steady direct current voltage may be 1.8 volts. The oscillator OSC 340 provides a clock signal to the control logic 350.

The control logic 350 receives the driver control signal from the Rx_PHY 320, the direct current voltage from the LDO_D 330, and the clock signal from the oscillator OSC 340. The control logic 350 may also receive digital data from the data input pin 222 and output a data output signal 354, a readback data signal 362, enable signals 352, 364, a PWM clock selection signal PWMCLK_sel 356, and a maximum current signal Max. Current 358. During the addressing mode, the control logic 350 activates the enable signal 352 to enable the output driver 360. The output driver 360 buffers the output signal 354 to the LED driving output pin 226 when the enable signal 352 is activated. When the output driver 360 is active, the control logic 350 may control the PWM dimming circuit 370 to turn off the transistor 375 to effectively block the current path from the LEDs.

When driving the LED zones 230, the control logic deactivates the enable signal 352 and the driver 360 is tri-stated to effectively decouple it from the LED driving output pin 226. The PWM clock selection signal PWMCLK_sel 356 specifies a duty cycle for controlling PWM dimming by the PWM dimming circuit 370. Based on the selected duty cycle, the PWM dimming circuit 370 controls timing of an on-state and an off-state of the transistor 375. During the on-state of the transistor 375, a current path is established from the LED driving output pin 226 (coupled to the LED zones 230) to the ground pin 228 through the transistor 375 and the brightness control circuit 380 to sink the driver current through the LEDs of the LEDs zones 230. During an off-state of the transistor 375, the current path is interrupted to block current from flowing through the LED zones 230. The brightness control circuit 380 receives the maximum current signal Max. Current 358 from the control logic 350 and controls the current level that flows through the LEDs (from the LED driving output pin 226 to the ground pin 228) when the transistor 375 is in the on-state. During the operational mode, the control logic 350 controls the duty cycle of the PWM dimming circuit 370 and the maximum current Max. Current 358 of the brightness control circuit 380 to set the LED zones 230 to the desired brightness.

The control logic also outputs readback data 362 through the readback driver 366 to the data output pin 232. The control logic 350 enables the readback driver 366 via the enable line 364 when it is outputting readback data 362 (e.g., when the control logic 350 receives a command targeted to its address). When the control logic 350 is not outputting readback data 362, the control logic 350 disables the readback driver 366 via the enable line 364 to put the data output pin 232 in a high impedance state so that the driver circuit 220 does not affect the voltage on the shared single wire communication line 225 while other driver circuits 220 in the group may be outputting data. As described above, alternative embodiments may include multiple LED driving output pins 226 for driving multiple channels of the LED zones 230 (e.g., 3 output pins 226 to drive three channels of LEDs) and may include parallel transistors 375 and associated control lines for driving each channel.

Figure 4:
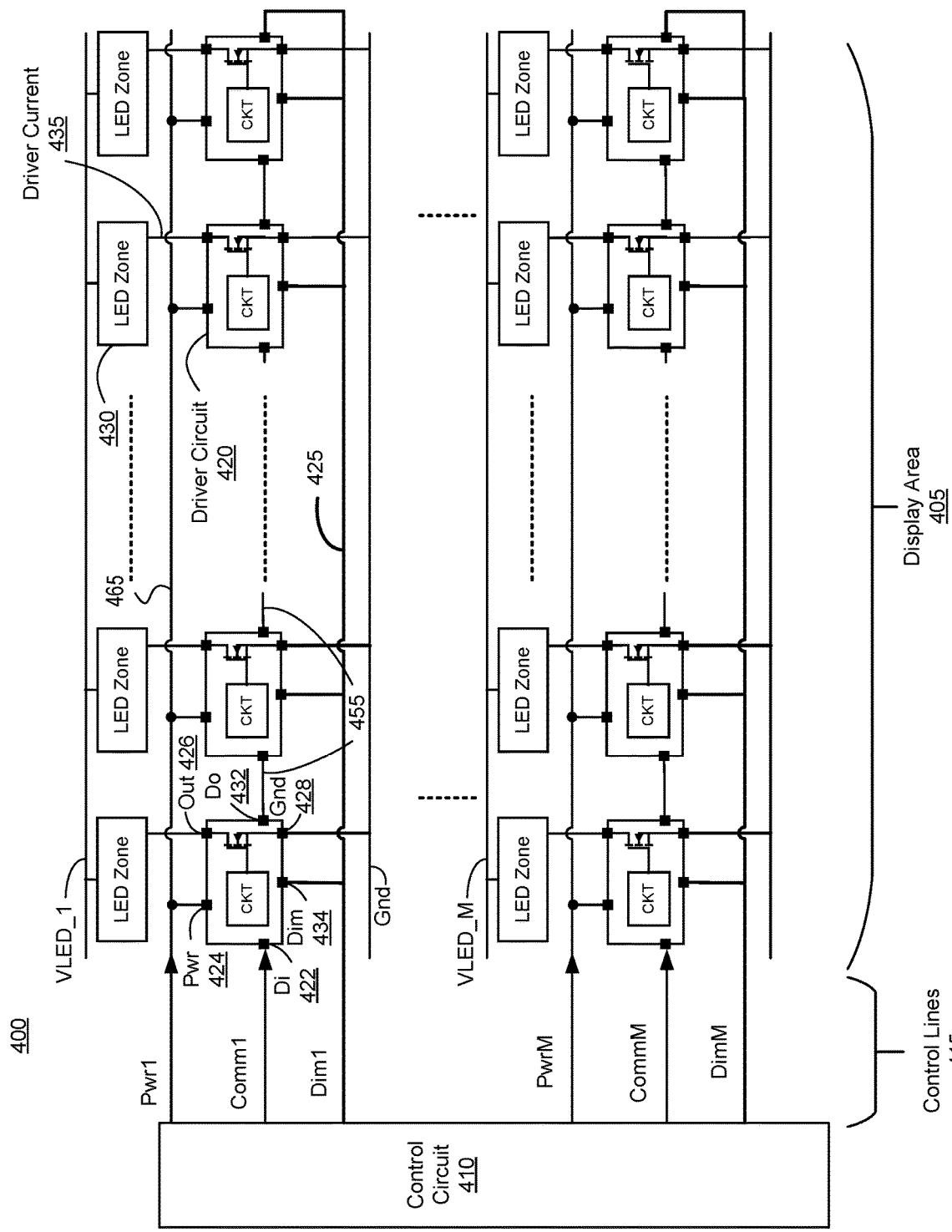
FIG. 4 is a circuit diagram of a display device including a 6-pin architecture for distributed driver circuits that provide feedback via a shared single wire communication line, according to one embodiment.

FIG. 4 illustrates another example embodiment of a display device 400 that utilizes a one wire readback interface 425. The display device 400 includes a control circuit 410, a set of control lines 415, and a display area 405. The display area 405 includes an array of driver circuits 420 for driving respective LED zones 430 via a driver current 435. The driver circuits 420 each include a power pin 424, a data input pin 422, an LED driving output pin 426, a data output pin 432, a dimming pin 434, and a ground pin 428. Serial communication lines 455 couple the control circuit 410 to a data input pin 422 of the first driver circuit 420 in a group of driver circuits 420 and couple serially between the data output pin 432 and the data input pin 422 of adjacent driver circuits 420. The dimming pins 434 of the driver circuits 420 in each group are coupled in parallel to a shared single wire communication line 425. A power line 465 couples to the power pins 424 of each driver circuit 420 in a group. Furthermore, a ground line couples to the ground pins 428 of each driver circuit 420 in the group.

The display device 400 is similar to the display device 200 of FIG. 2 except that the driver circuits 420 include a bidirectional parallel communication pin 434 coupled to a bidirectional shared single wire communication line 425. The shared single wire communication line 425 is used for both readback operations to send readback data from the driver circuits 420 to the control circuit 410 and optionally, to provide dimming commands from the control circuit 410 to the driver circuits 420. Readback commands may alternatively be issued to the driver circuits 420 using the serial communication lines 455 and serially coupled driver circuits 420. A separate power line 465 provides power via respective power input pins 424 (without modulated data). In an embodiment, the power line 465 could be shared between the driver circuits 420 and the LED zones 430 (VLED).

In an embodiment, the control circuit 410 may send a command for obtaining sensed channel voltages that can be utilized by the control circuit 410 to adaptively control the VLED supply as described above. The control circuit 410 may send a channel voltage sensing command through the serial communication line 455 and the driver circuits propagate the command or readback data through the chain as described above. The command may be targeted to a single driver circuit 420, which outputs the requested data to the single wire communication line 425 via the dimming pin 434. Alternatively, the command may be a group command in which case the driver circuits 420 operate to output the lowest detected channel voltage to the single wire communication line 425 using the techniques described above. In another implementation, the channel voltage sensing command may instead be issued through the single wire communication line 465 and the dimming input pin 434.

In another example, commands may similarly be sent to the driver circuits 420 through the serial communication lines 455 or the single wire communication line 425 to cause a targeted driver circuit 420 (specified by the address in the command) to sense and return different information via the single wire communication line 425 such as, for example, junction temperature, fault information, or other internal status information. Alternatively, group commands may be processed to output a single result to the control circuit 410 as described above.

In one embodiment, the serial communication line 455 between the control circuit 410 and the first driver circuit 420 may be coupled with the single wire communication line 425 and share a common pin of the control circuit 410.

As described for previous embodiments, one or more sensor circuits (not shown) may be coupled to the shared single wire communication line 425 (and may optionally also be coupled in series with the driver circuits 420). The sensor circuits may include similar pin configurations and external connections as the driver circuits 420 or may include fewer pins (e.g., at least the LED driving output pin 426 may be omitted). The sensor circuits may provide similar capabilities for facilitating serial communications within the group for addressing as described above and for providing requested readback data on the single wire communication line 425.

Figure 5:
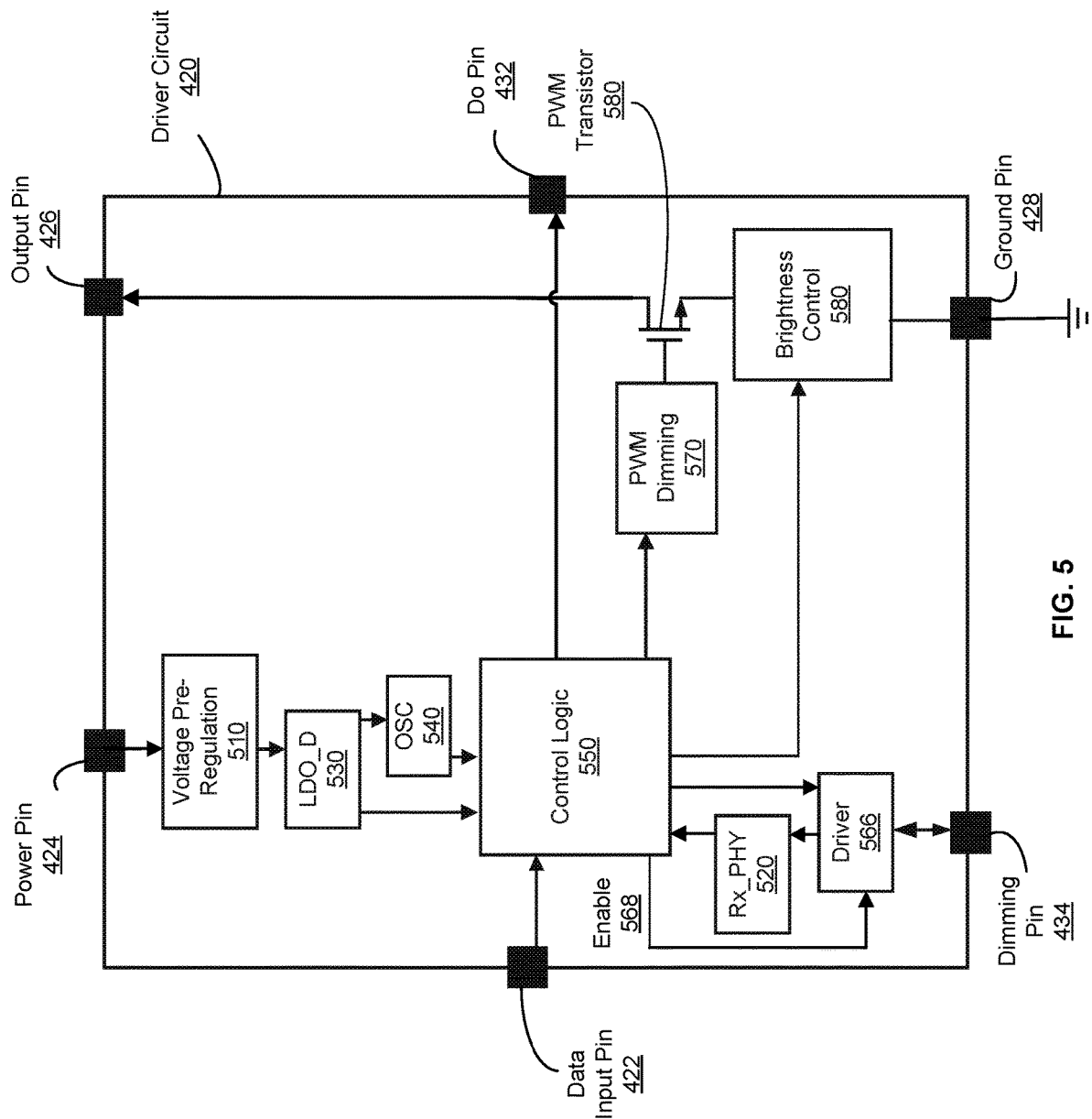
FIG. 5 is a circuit diagram of a 6-pin architecture of a driver circuit for a display device, according to one embodiment.

FIG. 5 illustrates an example embodiment of a driver circuit 420. The driver circuit 420 comprises a voltage pre-regulation circuit 510, a low dropout regulator 530, an oscillator 540, control logic 550, an Rx Phy 520, a driver circuit 566, a PWM dimming circuit 570, a brightness control circuit 580, and a transistor 580. The driver circuit 420 is generally similar to the driver circuit 220 of FIG. 3 except the bidirectional driver circuit 566 provides data from the dimming input pin 434 to the RX_Phy 520 and provides output data from the control logic 550 to the dimming pin 434 for communication on the single wire communication line 425. An enable signal 568 is controlled by the control logic 550 to put the driver circuit 566 in a high-impedance state when not receiving or sending data so that it does not interfere with other transmissions on the shared single wire communication line 425.

Figure 6:
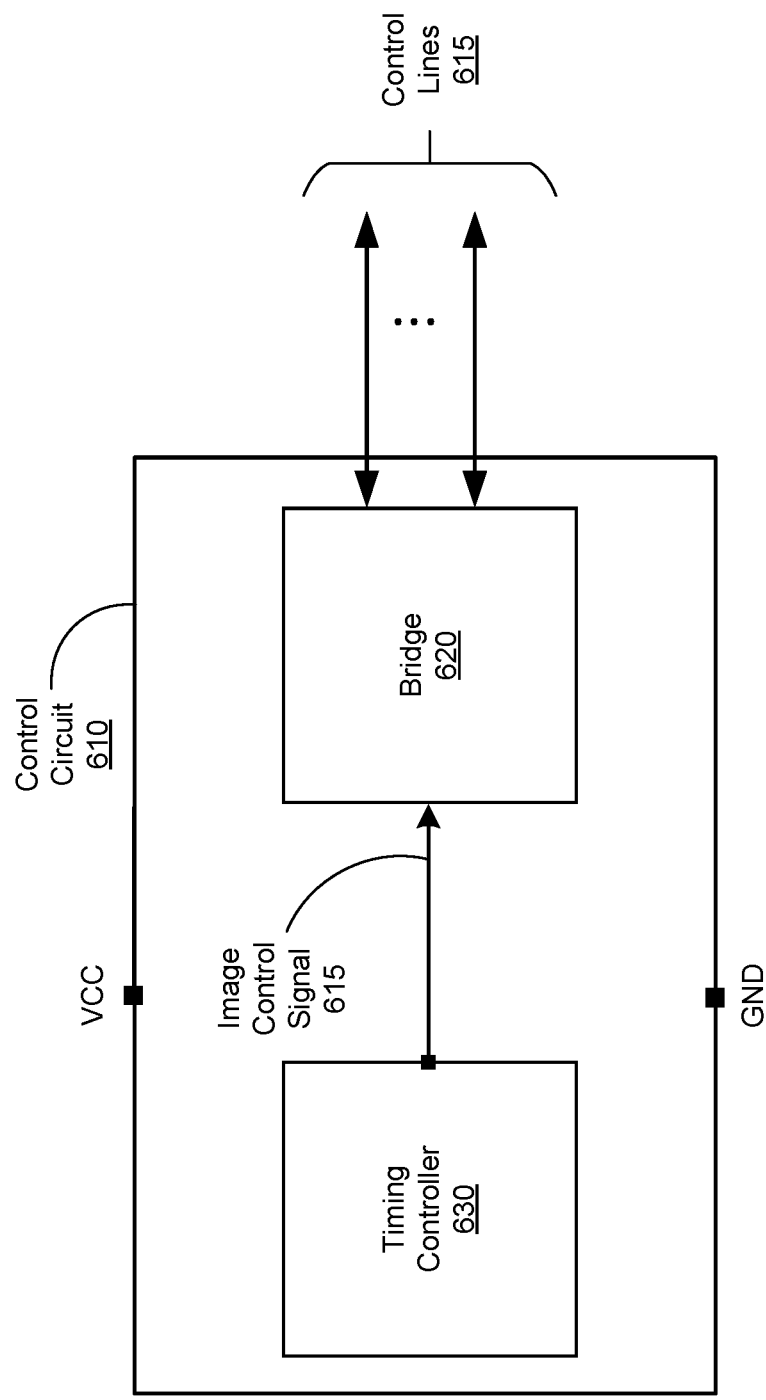
FIG. 6 is a block diagram of a control circuit for a display device, according to one embodiment.

FIG. 6 is an example circuit diagram of a control circuit 610 that may correspond to the control circuits 110, 210, or 410 of any of the preceding embodiments. The control circuit 610 controls operation of the display device based on signals communicated on control lines 615 as described above. The control circuit 610 may include a timing controller 630 and a bridge 620. The control circuit 610 may control the display device using either active matrix (AM) or passive matrix (PM) driving methods.

The timing controller 630 generates an image control signal 615 indicating values for driving pixels of the display device and timing for driving the pixels. For example, the timing controller 630 controls timing of image or video frames and controls timing of driving each of the LED zones within an image or video frame. Furthermore, the timing controller 630 controls the brightness for driving each of the LED zones during a given image or video frame. The image control signal 615 is provided by the timing controller 630 to the bridge 620.

The bridge 620 translates the image control signal 615 to generate the various signals to the device array including, for example, power communication signals, dimming signals, command signals, or other signals described in any of the preceding embodiments. Furthermore, the bridge 620 may receive feedback signals from the device array via the control lines 615 and adjust operation accordingly as described in any of the preceding embodiments.

Figure 7A:
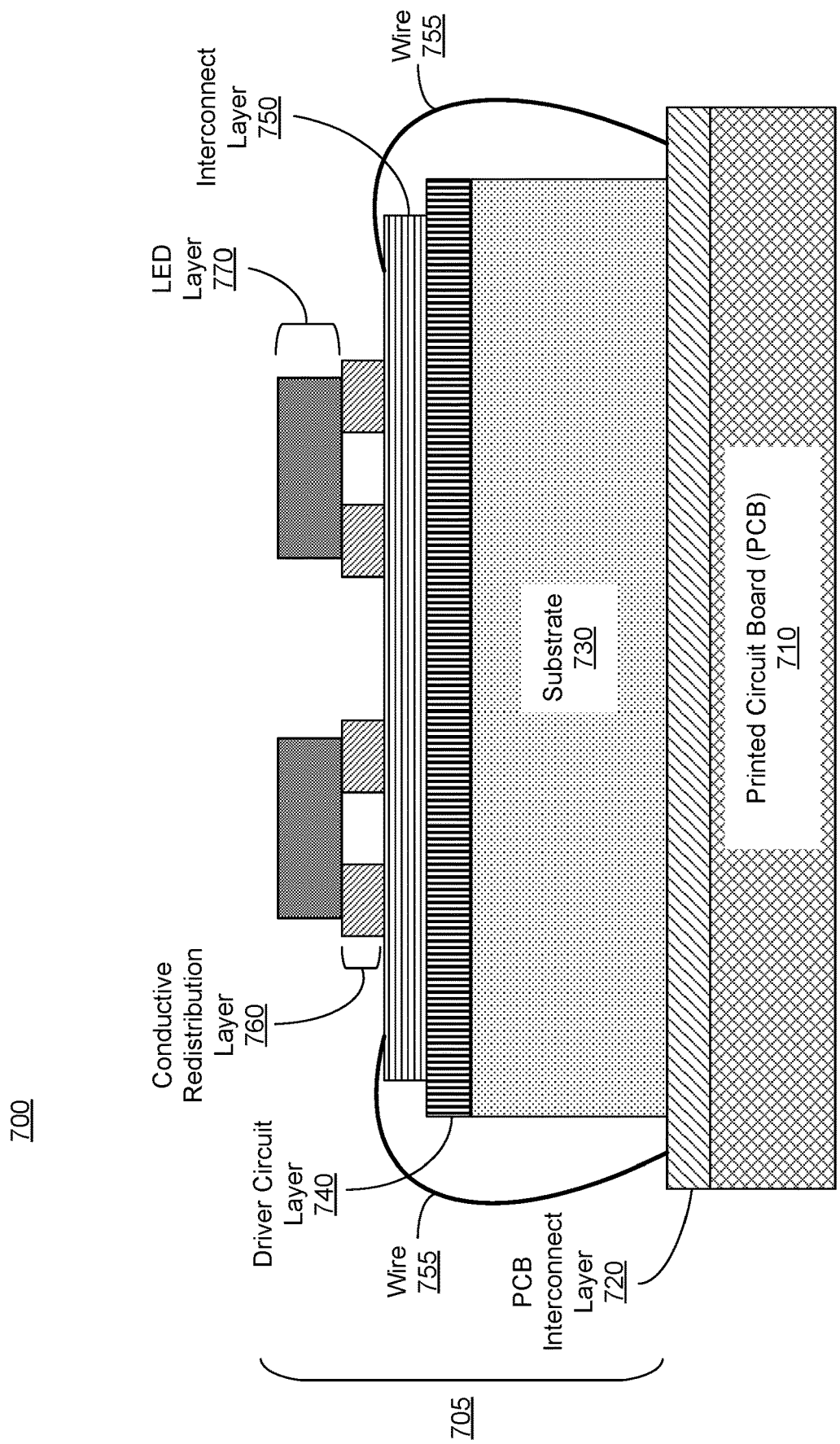
FIG. 7A is a cross sectional view of a first embodiment of an LED and driver circuit that may be utilized in a display device.

FIG. 7A is a cross sectional view of a first embodiment of a zone IC 700 that includes an integrated LED and driver circuit 705 in a single package. In the example shown in FIG. 7A, the circuit 700 includes a printed circuit board (PCB) 710, a PCB interconnect layer 720, and the integrated LED and driver circuit 705 which comprises a substrate 730, a driver circuit layer 740, an interconnect layer 750, a conductive redistribution layer 760, and an LED layer 770. Bonded wires 755 may be included for connections between the PCB interconnect layer 720 and the integrated LED and driver circuit 705. The PCB 710 comprises a support board for mounting the integrated LED and driver circuit 705, the control circuit 110 and various other supporting electronics. The PCB 710 may include internal electrical traces and/or vias that provide electrical connections between the electronics. A PCB interconnect layer 720 may be formed on a surface of the PCB 710. The PCB interconnect layer 720 includes pads for mounting the various electronics and traces for connecting between them.

The integrated LED and driver circuit 705 includes a substrate 730 that is mountable on a surface of the PCB interconnect layer 720. The substrate 730 may be, e.g., a silicon (Si) substrate. In other embodiments, the substrate 730 may include various materials, such as gallium arsenide (GaAs), indium phosphide (InP), gallium nitride (GaN), AlN, sapphire, silicon carbide (SiC), or the like.

A driver circuit layer 740 may be fabricated on a surface of the substrate 730 using silicon transistor processes (e.g., BCD processing) or other transistor processes. The driver circuit layer 740 may include one or more driver circuits (e.g., a single driver circuit or a group of driver circuits arranged in an array). An interconnect layer 750 may be formed on a surface of the driver circuit layer 740. The interconnect layer 750 may include one or more metal or metal alloy materials, such as Al, Ag, Au, Pt, Ti, Cu, or any combination thereof. The interconnect layer 750 may include electrical traces to electrically connect the driver circuits 150 in the driver circuit layer 740 to wire bonds 755, which are in turn connected to the control circuit on the PCB 710. In an embodiment, each wire bond 755 provides an electrical connection. In an embodiment, each wire bond 755 provides an electrical connection to the control circuit in accordance with the connections described in any of the preceding embodiments.

In an embodiment, the interconnect layer 750 is not necessarily distinct from the driver circuit layer 740 and these layers 740, 750 may be formed in a single process in which the interconnect layer 750 represents a top surface of the driver layer 740.

The conductive redistribution layer 760 may be formed on a surface of the interconnect layer 750. The conductive redistribution layer 760 may include a metallic grid made of a conductive material, such as Cu, Ag, Au, Al, or the like. An LED layer 770 includes LEDs that are on a surface of the conductive redistribution layer 760. The LED layer 770 may include arrays of LEDs arranged into the LED zones as described above. The conductive redistribution layer 760 provides an electrical connection between the LEDs in the LED layer 770 and the one or more driver circuits in the driver circuit layer 740 for supplying the driver current and provides a mechanical connection securing the LEDs over the substrate 730 such that the LED layer 770 and the conductive redistribution layer 760 are vertically stacked over the driver circuit layer 740.

Thus, in the illustrated circuit 700, the one or more driver circuits and the LED zones including the LEDs are integrated in a single package including a substrate 730 with the LEDs in an LED layer 770 stacked over the driver circuits in the driver circuit layer 740. By stacking the LED layer 770 over the driver circuit layer 740 in this manner, the driver circuits can be distributed in the display area of a display device.

Figure 7B:
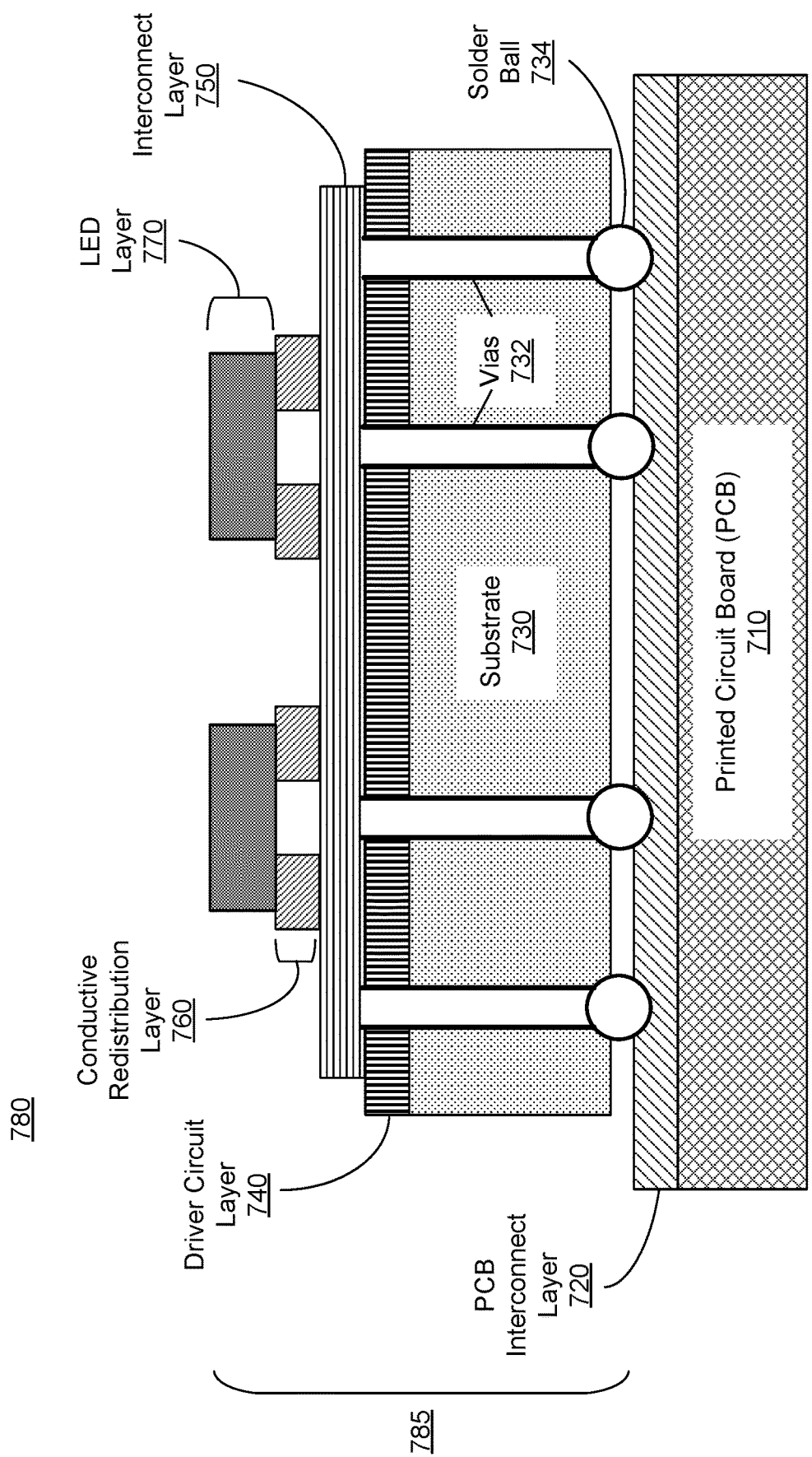
FIG. 7B is a cross sectional view of a second embodiment of an LED and driver circuit that may be utilized in a display device.

FIG. 7B is a cross sectional view of a second embodiment of a display device 780 including an integrated LED and driver circuit 785, according to one embodiment. The device 780 is substantially similar to the device 700 described in FIG. 7A but utilizes vias 732 and corresponding connected solder balls 734 to make electrical connections between the driver circuit layer 740 and the PCB 710 instead of the wires 755. Here, the vias 732 are plated vertical electrical connections that pass completely through the substrate layer 730. In one embodiment, the substrate layer 730 is a Si substrate and the through-chip vias 732 are Through Silicon Vias (TSVs). The through-chip vias 732 are etched into and through the substrate layer 730 during fabrication and may be filled with a metal, such as tungsten (W), copper (C), or other conductive material. The solder balls 734 comprise a conductive material that provide an electrical and mechanical connection to the plating of the vias 732 and electrical traces on the PCB interconnect layer 720. In one embodiment, each via 732 provides an electrical connection for providing signals such as the driver control signal from the control circuit on the PCB 710 to a group of driver circuits on the driver circuit layer 740. The vias 732 may also provide connections for the incoming and outgoing addressing signals, the supply voltage (e.g., VLED) to the LEDs in a LED zone on the LED layer 770, and a path to a circuit ground (GND).

Figure 7C:
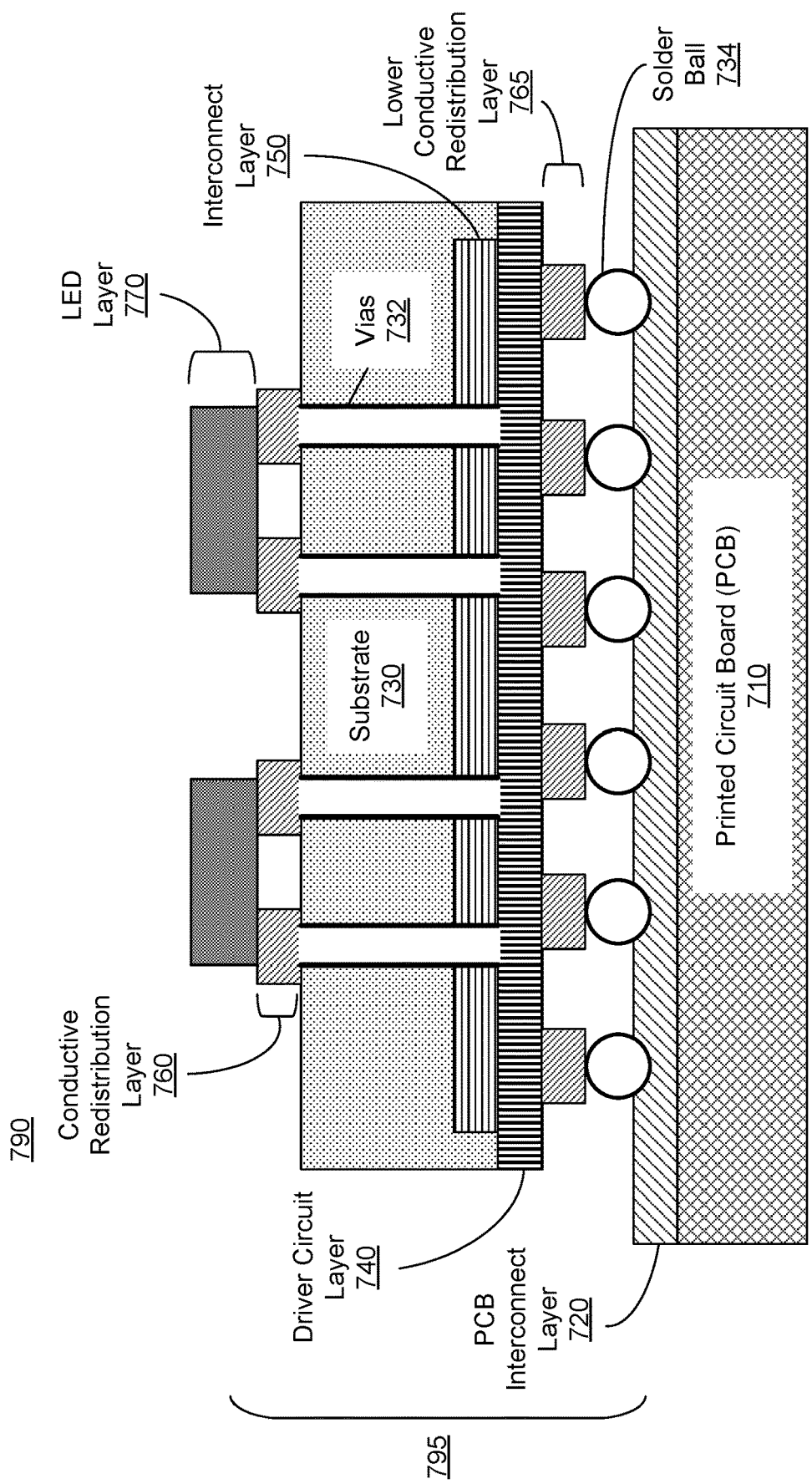
FIG. 7C is a cross sectional view of a third embodiment of an LED and driver circuit that may be utilized in a display device.

FIG. 7C is a cross sectional view of a third embodiment of a display device 790 including an integrated LED and driver circuit 795. The device 790 is substantially similar to the device 780 described in FIG. 7B but includes the driver circuit layer 740 and interconnect layer 750 on the opposite side of the substrate 730 from the conductive redistribution layer 760 and the LED layer 770. In this embodiment, the interconnect layer 750 and the driver circuit layer 740 are electrically connected to the PCB 710 via a lower conductive redistribution layer 765 and solder balls 734. The lower conductive redistribution layer 765 and solder balls 734 provide mechanical and electrical connections (e.g., for the driver control signals) between the driver circuit layer 740 and the PCB interconnect layer 720. The driver circuit layer 740 and interconnect layer 750 are electrically connected to the conductive redistribution layer 760 and the LEDs of the LED layer 770 via one or more plated vias 732 through the substrate 730. The one or more vias 732 seen in FIG. 7C may be utilized to provide the driver currents from the driver circuits in the driver circuit layer 740 to the LEDs in the LED layer 770 and other signals as described above In alternative embodiments, the integrated driver and LED circuits 705, 785, 795 may be mounted to a different base such as a glass base instead of the PCB 710.

Figure 8:
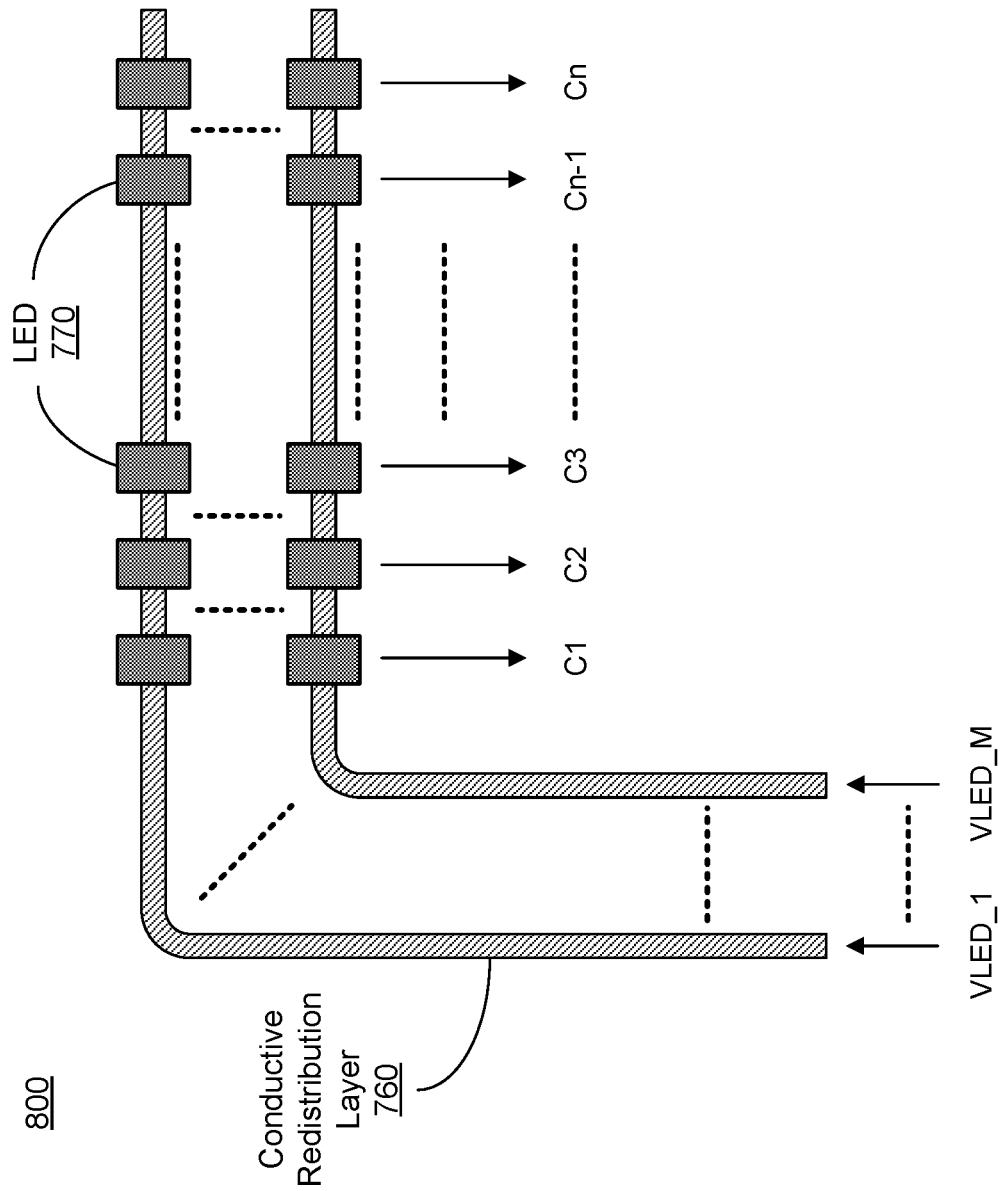
FIG. 8 is a top down view of a display device using an LED and driver circuit, according to one embodiment.

FIG. 8 is a top down view 800 of a display device using an integrated LED and driver circuit, according to one embodiment. The circuit 1100 can correspond to a top view of any of the integrated LED and driver circuits 705, 785, 795 depicted in FIGS. 7A-7C. A plurality of LEDs of an LED lay 770 is arranged in rows and columns (e.g., C1, C2, C3, . . . Cn-1, Cn). For passive matrix architectures, each row of LEDs of the LED layer 770 is connected by a conductive redistribution layer 760 to a demultiplexer which outputs a plurality of VLED signals (i.e., VLED_1 . . . VLED_M). The VLED signals provide power (i.e., a supply voltage) to a corresponding row of LEDs of the LED layer 770 via the conductive redistribution layer 760.

Figure 9:
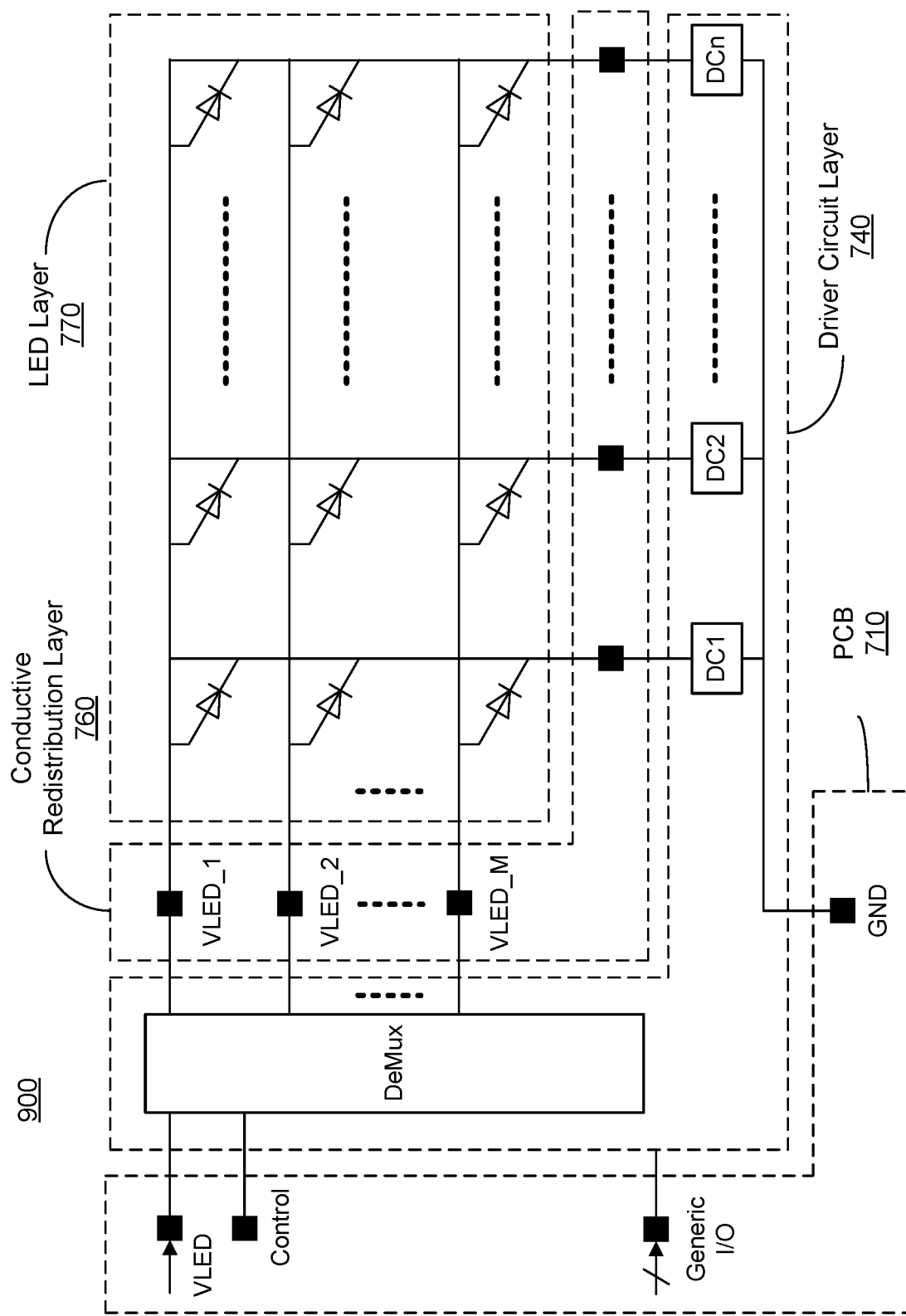
FIG. 9 illustrates a schematic view of several layers of an LED and driver circuit for a display device, according to one embodiment.

FIG. 9 illustrates a schematic view 900 of several layers of a display device with an integrated LED and driver circuit, according to one embodiment. The schematic view includes the PCB 710, the driver circuit layer 740, the conductive redistribution layer 760, and the LED layer 770 as described in FIGS. 7A-7C. The schematic of FIG. 9 shows circuit connections for the circuits 705, 785, 795 of FIGS. 7A-7C but does not reflect the physical layout. As described above, in the physical layout, the LED layer 770 is positioned on top of (i.e., vertically stacked over) the conductive redistribution layer 760. The conductive redistribution layer 760 is positioned on top of the driver circuit layer 740 and the driver circuit layer 740 is positioned on top of the PCB 710.

The PCB 710 includes a connection to a power source supplying power (e.g., VLED) to the LEDs, a control circuit for generating a control signal, generic I/O connections, and a ground (GND) connection. The driver circuit layer 740 includes a plurality of driver circuits (e.g., DC1, DC2, . . . DCn) and a demultiplexer DeMux. The conductive redistribution layer 760 provides electrical connections between the driver circuits and the demultiplexer DeMux in the driver circuit layer 740 to the plurality of LEDs in the LED layer 770. The LED layer 770 includes a plurality of LEDs arranged in rows and columns. In this example implementation, each column of LEDs is electrically connected via the conductive redistribution layer 760 to one driver circuit in the driver circuit layer 740. The electrical connection established between each driver circuit and its respective column of LEDs controls the supply of driver current from the driver circuit to the column. In this embodiment each diode shown in the LED layer corresponds to an LED zone. Each row of LEDs is electrically connected via the conductive redistribution layer 760 to one output (e.g., VLED_1, VLED_2, . . . VLED_M) of the demultiplexer DeMux in the driver circuit layer 740. The demultiplexer DeMux in the driver circuit layer 740 is connected to a power supply (VLED) and a control signal from the PCB 710. The control signal instructs the demultiplexer DeMux which row or rows of LEDs are to be enabled and supplied with power using the VLED lines. Thus, a particular LED in the LED layer 770 is activated when power (VLED) is supplied on its associated row and the driver current is supplied to its associated column.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

The invention claimed is:

1. A display device comprising:
an array of light emitting diode zones each comprising one or more light emitting diodes that generate light in response to respective driver currents;
a control circuit to generate driver control signals and command signals;
a group of driver circuits distributed in the display area of the display device, each driver circuit in the group to drive a respective light emitting diode zone by controlling the respective driver currents via a first pin of the driver circuit in response to one or more of the driver control signals;
a shared single wire communication line to couple an output of each driver circuit of the group of driver circuits to the control circuit via a second pin of each driver circuit,
wherein responsive to a target driver circuit in the group of driver circuits receiving a command signal from the control circuit, an output of the target driver circuit that is coupled to the shared single wire communication line via a second pin of the target driver circuit outputs a readback signal to the control circuit via the shared single wire communication line through the second pin of the target driver circuit,
wherein the target driver circuit controls a driver current of a light emitting zone via the first pin of the target driver circuit but not the second pin of the target driver circuit.

2. The display device of claim 1, further comprising:
a power communication line coupled to the group of driver circuits and to the control circuit, the power communication line to provide a supply voltage to the group of driver circuits that is modulated with the driver control signals for controlling the driver circuits.

3. The display device of claim 2, wherein the supply voltage of the power communication line is further modulated to provide the command signals to the group of driver circuits.

4. The display device of claim 1, wherein the control circuit provides the command signals and the driver control signals via the shared single wire communication line.

5. The display device of claim 1, further comprising:
a set of serial communication lines coupled between adjacent driver circuits and to the control circuit in a serial communication chain, wherein the control circuit facilitates assignment of addresses to the driver circuits during an addressing mode based on addressing signals transmitted through the serial communication chain.

6. The display device of claim 5, wherein the control circuit further provides the command signals through the serial communication chain.

7. The display device of claim 5, wherein each of the driver circuits in the group of driver circuits comprises:
   a data input pin coupled to the control circuit or to a previous driver circuit in the serial communication chain;
   an LED driving output pin coupled to the control circuit or to a next driver circuit in the serial communication chain, and coupled to a corresponding LED zone to control driving of the corresponding LED zone;
   the output including a data output pin coupled to the shared single wire communication line;
   a power line communication pin coupled to a power communication line providing a supply voltage modulated with the driver control signals and the command signals; and
   a ground pin coupled to ground.

8. The display device of claim 5, wherein each of the driver circuits in the group of driver circuits comprises:
   a data input pin coupled to the control circuit or to a previous driver circuit in the serial communication chain;
   the output including a data output pin coupled to the control circuit or to a next driver circuit in the serial communication chain;
   an LED driving output pin coupled to a corresponding LED zone to control driving of the corresponding LED zone;
   a dimming pin coupled to the shared single wire communication line;
   a power pin coupled to a supply voltage; and
   a ground pin coupled to ground.

9. The display device of claim 1, wherein the command signals comprise temperature sensing request signals, and wherein response to receiving the temperature sensing request signals, the driver circuits output sensed temperatures to the control circuit via the shared single wire communication line, and wherein the control circuit adjusts the driver control signals responsive to the sensed temperatures.

10. The display device of claim 1, wherein the command signals comprise channel voltage request signals, and wherein response to receiving the channel voltage request signals, the driver circuits output via the output of each driver circuit of the group of driver circuits sensed channel voltages associated with the light emitting diode zones to the control circuit via the shared single wire communication line, and wherein the control circuit adjusts the driver control signals responsive to the sensed channel voltages.

11. The display device of claim 1, wherein each of the light emitting diode zones and corresponding driver circuit are stacked over a substrate in an integrated package.

12. A zone integrated circuit including a driver circuit for a display device comprising:
   control logic to operate in at least an addressing mode and an operational mode, wherein in the operational mode, the control logic obtains a driver control signal and controls a driver current to an LED zone based on the driver control signal, and the control logic further receives commands and outputs readback data responsive to the commands, and wherein in the addressing mode, the control logic obtains an incoming addressing signal, stores an address for the driver circuit based on the incoming addressing signal, and generates an outgoing addressing signal based on the incoming addressing signal;
   an LED driving output pin to sink the driver current during the operational mode and to output the outgoing addressing signal during the addressing mode;
   a data input pin to receive the incoming addressing signal during the addressing mode;
   a power line communication pin coupled to a power communication line to provide a supply voltage and to provide the driver control signal and the commands as digital data modulated on the supply voltage;
   a data output pin to output readback data to a shared single wire communication line in response to the commands;
   a ground pin to provide a path to ground.

13. The zone integrated circuit of claim 12, further comprising:
   one or more LEDs of an LED zone;
   wherein the one or more LEDs and the driver circuit are stacked over a substrate in an integrated package.

14. The zone integrated circuit of claim 12, wherein the commands comprise a temperature sensing request, and wherein response to receiving the temperature sensing request, the control logic obtains and outputs a sensed temperature.

15. The zone integrated circuit of claim 12, wherein the commands comprise a channel voltage sensing request, and wherein response to receiving the channel voltage sensing request, the control logic obtains and outputs a sensed channel voltage.

16. The zone integrated circuit of claim 12, wherein the commands comprise a fault detection request, and wherein response to receiving the fault detection request, the control logic obtains and outputs a fault condition.

17. A zone integrated circuit including a driver circuit for a display device comprising:
   control logic to operate in at least an addressing mode and an operational mode, wherein in the operational mode, the control logic obtains a driver control signal and controls a driver current to an LED zone based on the driver control signal, and the control logic further receives commands and outputs readback data responsive to the commands, and wherein in the addressing mode, the control logic obtains an incoming addressing signal, stores an address for the driver circuit based on the incoming addressing signal, and generates an outgoing addressing signal based on the incoming addressing signal;
   an LED driving output pin to sink the driver current during the operational mode;
   a data input pin to receive the incoming addressing signal during the addressing mode;
   a data output pin to output the outgoing addressing signal during the addressing mode;
   a bidirectional dimming pin to receive the driver control signals from a single wire communication line and to output the readback data to the single wire communication line responsive to the commands;
   a power pin to provide a supply voltage; and
   a ground pin to provide a path to ground.

18. The zone integrated circuit of claim 17, further comprising:
   one or more LEDs of an LED zone;
   wherein the one or more LEDs and the driver circuit are stacked over a substrate in an integrated package.

19. The zone integrated circuit of claim 17, wherein the commands comprise a temperature sensing request, and wherein response to receiving the temperature sensing request, the control logic obtains and outputs a sensed temperature.

20. The zone integrated circuit of claim 17, wherein the commands comprise a channel voltage sensing request, and wherein response to receiving the channel voltage sensing request, the control logic obtains and outputs a sensed channel voltage.

21. The zone integrated circuit of claim 17, wherein the commands comprise a fault detection request, and wherein response to receiving the fault detection request, the control logic obtains and outputs a fault condition.

\* \* \* \* \*